United States Patent [19]

Carney

[11] Patent Number: 4,771,732
[45] Date of Patent: Sep. 20, 1988

[54] ANIMAL AMUSEMENT DEVICE

[76] Inventor: Joseph H. Carney, 13495 Meyer Rd., Whittier, Calif. 90605

[21] Appl. No.: 940,598

[22] Filed: Dec. 11, 1986

[51] Int. Cl.$^4$ ............................................. A01K 15/00
[52] U.S. Cl. ...................................................... 119/29
[58] Field of Search ............... 119/29, 19, 1; 229/126; 383/33, 34

[56] References Cited

U.S. PATENT DOCUMENTS

| | | | |
|---|---|---|---|
| 4,010,888 | 3/1977 | Gilbert | 119/19 X |
| 4,177,761 | 12/1979 | Bellocchi, Jr. | 119/29 X |
| 4,379,519 | 4/1983 | Sherwood | 383/33 |
| 4,417,609 | 11/1983 | Sherwood | 383/33 X |

Primary Examiner—Robert Peshock
Attorney, Agent, or Firm—Jack C. Munro

[57] ABSTRACT

An animal amusement device comprising a flexible walled bag-type of enclosure defining an internal compartment. There is located a single enlarged access opening to provide entry and exit of an animal into and out of the internal compartment. An animal is to be enticed into the internal compartment and amuse itself by tearing at the wall of the internal compartment.

4 Claims, 1 Drawing Sheet

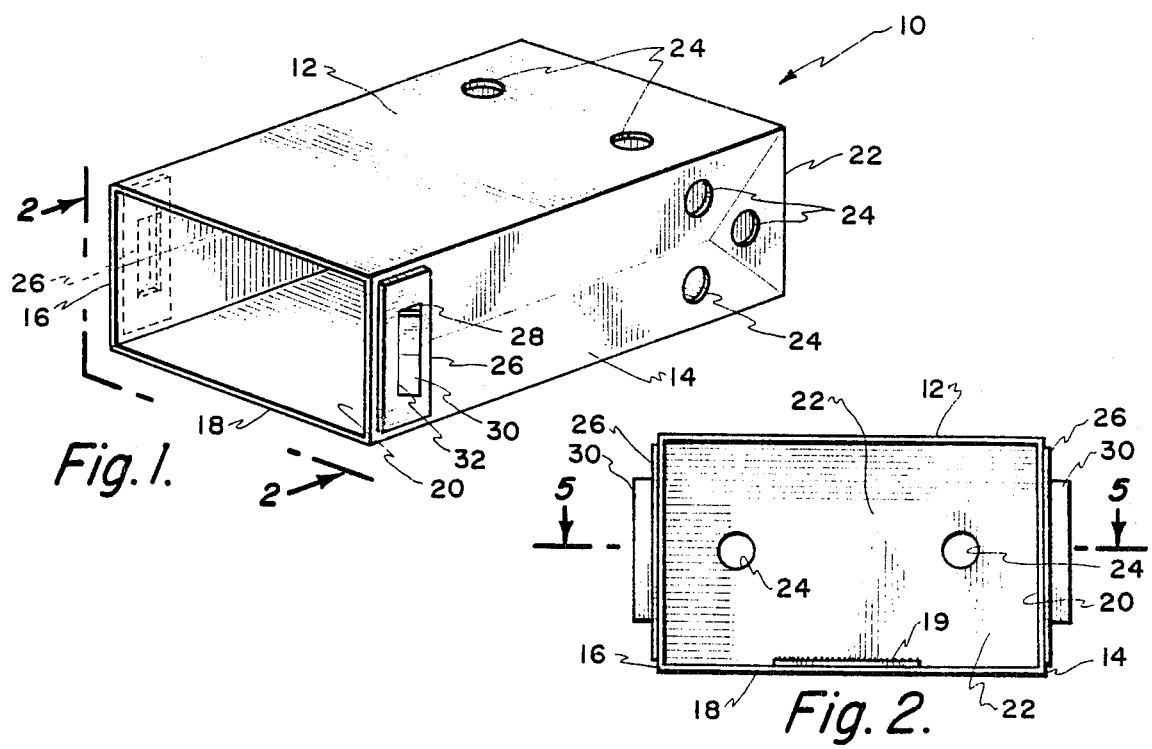
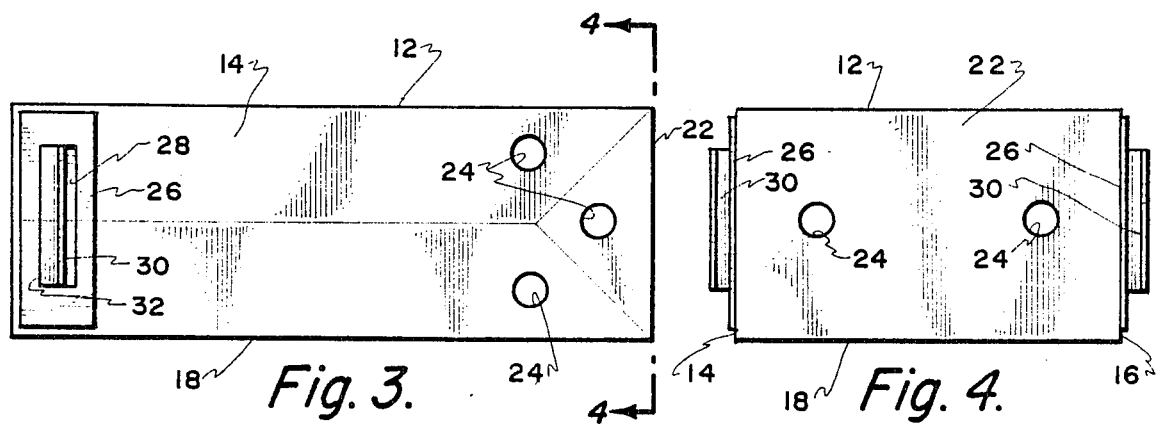
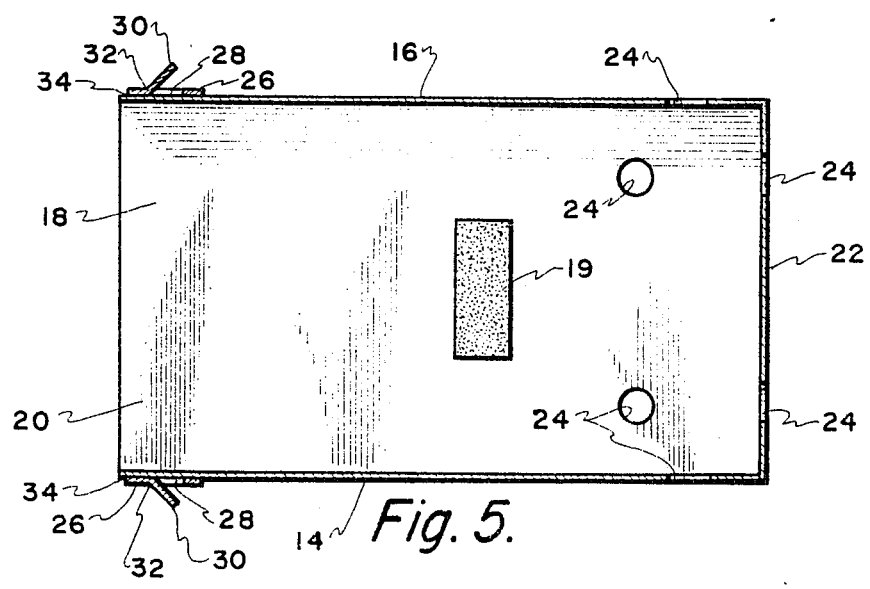

ANIMAL AMUSEMENT DEVICE

BACKGROUND OF THE INVENTION

The field of this invention relates to amusement devices and more particularly to an amusement device for an animal such as a cat.

Animal toys have long been known. A convenient form of an animal toy for a dog or a cat comprises a ball or other similar type of movable type of object that can make noise or may include some kind of an attractant in order to encourage the animal to play with the toy.

Certain animals, such as cats, have a natural instinct to enter into small enclosed spaces. It is frequently common to any cat owner to see the cat enter to the inside of a cabinet when the cabinet door is open, or enter into a drawer when a drawer is open. To most people, this natural instinct constitutes an annoyance as the cat ends up getting into areas that the cat should not be. Prior to the present invention, it is believed that there has never been constructed an animal amusement device which takes advantage of the basic instinct of the animal to move into a confined space.

SUMMARY OF THE INVENTION

The animal amusement device of the present invention is designed to be constructed of a flexible thin-walled bag-like enclosure. The enclosure has an enlarged access opening permitting access of the animal into and out of the internal compartment of the enclosure. The enclosure can be folded into a collapsed position to facilitate storage. When the enclosure is located in its open (usage) position, there is to be moved a pair of flaps to an outwardly extending position. These flaps are mounted on the exterior wall surface of the enclosure directly adjacent the access opening. These flaps function to maintain the enclosure in the open position. Normally there will be impregnated or applied to the enclosure an attractant that will emit an odor that is attractive to the animal. The enclosure will also normally include a series of ventilation openings within the enclosure.

BRIEF DESCRIPTION OF THE DRAWING

FIG. 1 is an isometric view of the animal amusement device of this invention, showing the device in the open position;

FIG. 2 is a front end view of the animal amusement device of this invention taken along line 2—2 of FIG. 1;

FIG. 3 is a side elevational view of the animal amusement device of this invention;

FIG. 4 is a back view of the animal amusement device of this invention taken along line 4—4 of FIG. 3; and FIG. 5 is a cross-sectional view of the animal amusement device of this invention taken along line 5—5 of FIG. 2.

DETAILED DESCRIPTION OF THE SHOWN EMBODIMENT

Referring particularly to the drawing, there is shown the animal amusement device 10 of this invention which is generally formed into an enclosure defined by an upper wall 12, side walls 14 and 16, bottom wall 18 and back wall 22. Observing the device 10 in FIG. 2 it can be seen that the walls 12, 14, 16 and 18 form a basic rectangular shape with walls 12 and 18 being of the same width and the walls 14 and 16 being of the same width. The walls 12, 14, 16 and 18 are all of the same length. These walls combine to form an internal compartment 20.

The internal compartment 20 is only formed when the device 10 is in the open position shown in the drawing. However, it is to be understood that the device can be moved to a collapsed position (not shown) which will result in wall 12 abutting wall 18 and walls 14 and 16 being folded along a crease line (not shown) along the longitudinal middle of each of the walls 14 and 16.

Incorporated through the surface of the walls 12, 14, 16 and 18 there will be located a plurality of ventilating holes 24. The function of the holes 24 is to provide air into the internal compartment 20 so as to prevent suffocation of any animal located within the compartment 20.

In order to encourage the animal to enter into the internal compartment 20 there may be included an attractant 19. The attractant 19 will generally be applied to the wall surface of the internal compartment 20. Generally, the form of attractant would be a substance which emits an odor that is found to be attractive by the particular animal that is being encouraged to enter the compartment 20. For a cat, a desirable form of attractant would be catnip or possibly a fish odor.

To insure that the device 10 will remain in the open position during its usage and not have a tendency to collapse upon itself, there is mounted on both walls 14 and 16, adjacent the access opening into the internal compartment 20, a sheet material frame 26. Frame 26 will normally be constructed of paper or other similar type of material. It is to be understood that there is to be frame 26 mounted on the wall 14 with a similar frame 26 mounted on the exterior surface of the wall 16. The frame 26 defines an enclosed area 28. Located within the enclosed area 28 is a flap 30. The flap 30 is hingedly connected by hinge 32 to a section of the frame 26.

When the device 10 is located in the collapsed position the flap 30 as well as the frame 26 will be bent in half, or upon itself, with the flap 30 being located within the enclosed area 28. When the device 10 is in the open position, each flap 30 is moved to a ninety degree displaced position relative to its respective frame 26, such as is clearly shown within the drawing. The flap 30, when moved to this position, is constructed to remain in this position when the device 10 is left unattended. With each of the flaps 30 located in this angularly displaced position, the flaps 30 will prevent natural collapsing of the device 10 and will then maintain the device 10 in the open position. Each of the frames 26 are to be secured to the walls 14 and 16 by means of a glue 34.

Normally, when the device 10 of this invention is purchased, it is located in the collapsed position (not shown). When it is desirable to use the device 10, a person will move the device 10 into the open position as shown in the drawing. The flaps 30 are then extended and pressed to maintain themselves in their extended position and the device 10 is then placed on a floor or other similar type of supportive surface. At that particular time the animal (not shown) will be enticed to enter the internal compartment 20 and generally will be inclined to amuse itself within the compartment 20. This amusement may result in the destruction of the device 10. Upon the device 10 being destroyed, it is to be merely replaced.

What is claimed is:

1. An animal amusement device comprising:

a flexible thin-walled enclosure having an internal compartment, said enclosure being substantially closed except for an access opening providing entry and exit of an animal into and out of said internal compartment, whereby an animal is capable of being located within said internal compartment and amusing itself by tearing at the walls of said enclosure;

said enclosure being foldable to a collapsed position substantially eliminating said internal compartment, during usage said enclosure is to be moved from the collapsed state to an open position; and means attached to a portion of said enclosure to maintain said device in said open position, said means comprising a pair of planar flaps mounted on the exterior wall surface of said enclosure directly adjacent said access opening, each said flap being movable to an extended position so the plane of said flap is located substantially perpendicular to said portion thereby preventing movement of said enclosure to said collapsed position, with the plane of said flap located parallel to said portion the said enclosure being movable to said collapsed position.

2. The animal amusement device as defined in claim 1 wherein:

said means comprising a pair of bendable flaps mounted on the exterior wall surface of said enclosure directly adjacent said access opening.

3. The animal amusement device as defined in claim 1 wherein:

said enclosure including a plurality of ventilation openings for providing ventilation into said internal compartment.

4. The animal amusement device as defined in claim 3 wherein:

an animal attractant being applied to said enclosure to thereby provide a desirable odor for the animal within said internal compartment.

* * * * *